United States Patent [19]

Rideout, Jr.

[11] 4,439,987
[45] Apr. 3, 1984

[54] PRIME MOVER OPERATED BY THE EXPANSION AND CONTRACTION OF A TUBULAR METAL MEMBER OF SUBSTANTIAL LENGTH

[76] Inventor: Merle C. Rideout, Jr., 415 Congress St., Portland, Me. 04101

[21] Appl. No.: 301,589

[22] Filed: Sep. 14, 1981

[51] Int. Cl.$^3$ .............................................. F03G 7/02
[52] U.S. Cl. .................................. 60/641.11; 60/527
[58] Field of Search ............. 60/527, 528, 529, 641.11

[56] References Cited

U.S. PATENT DOCUMENTS

| | | | |
|---|---|---|---|
| 99,992 | 2/1870 | Wilkins et al. | 60/527 |
| 3,678,685 | 7/1972 | Low et al. | 60/529 |
| 3,699,769 | 10/1972 | Bondurant | 60/527 |
| 3,937,019 | 2/1976 | Renner | 60/527 |
| 3,987,630 | 10/1976 | Hein et al. | 60/527 |

*Primary Examiner*—Allen M. Ostrager
*Assistant Examiner*—Stephen F. Husar

[57] ABSTRACT

A prime mover has a tubular metal member of substantial length which, when both its exterior and its interior are subjected to a heating and cooling cycle, produces work strokes of substantial force, but too short to accomplish a wanted work. A mechanism connected to at least one end of the tubular member converts the short work strokes into strokes of increased lengths with a proportional decrease in force, but with the resulting work stroke lengths and force adequate to accomplish the wanted work.

7 Claims, 9 Drawing Figures

PRIME MOVER OPERATED BY THE EXPANSION AND CONTRACTION OF A TUBULAR METAL MEMBER OF SUBSTANTIAL LENGTH

BACKGROUND REFERENCE

U.S. Pat. No. 4,014,170

RELATED APPLICATION

Ser. No. 226,915, filed Jan. 21, 1981, now U.S. Pat. No. 4,388,805, Entitled "Power Plants Deriving Their Energy From Expansion and Contraction"

BACKGROUND OF THE INVENTION

The coefficient of expansion of metals has been used in various ways for various purposes of which one is illustrated by the above referred-to U.S. patent.

In my copending application, I have disclosed the use of long metal members of stock which when heated and cooled provide expansion and contraction forces to one end of a long lever the fulcrum of which is located to provide work strokes several times the length of the strokes provided by the expansion and contraction of the long metal member by itself. The other end of the lever included an arcuate rack which meshed with a pinion on a shaft by which a mechanism or mechanisms are operated to convert the energy of each work stroke to a form that can be stored and released at a controlled rate to accomplish work, in the disclosed embodiments, to operate generators.

While such a power plant has yet to be built and tested, the cross sectional dimensions of the stock impose some limitations as it must be capable of functioning without distortion both while being heated and cooled and while operating the lever. In addition, the cross sectional dimensions of the stock affect the heat exchange rate.

THE PRESENT INVENTION

The general objective of the present invention is to provide long metal members that are well adapted to provide work strokes of wanted force without distortion as they are extended and contracted during the heating and cooling cycles.

This objective is attained by forming the long metal members of tubular metal stock, preferably an aluminum alloy, with a wall thickness selected to enable work strokes of a predetermined maximum PSI to be provided and applied without distortion, with heat exchanging functions at an optimum and with both their exterior and their interior surfaces exposed to heating and cooling.

In the case of a tubular member in the form of a vertical coil and space limitations or other considerations will often dictate the use of such vertical coils, both the heating and cooling media should be forcibly circulated through it. Such vertical coils may be so housed that they may be solar heated and cooled by night air. Supplemental or alternate heating and cooling means may be used if economically feasible, such for example as sprays for cooling and using hot waste exhaust gases for heating.

Horizontal members, whether a coil, curved or straight may be used where space is available together with suitable heating and cooling media. For examples, such members could be incorporated in the cooling water systems of nuclear operated power plants, in locations where such members would be heated by hot sand and cooled at night or by tidewater, water to be used in irrigation or diverted river water by way of examples. In addition in certain locations relatively warm surface sea water and relatively cold deep sea water be used to provide the work strokes of such prime movers.

Such a prime mover for many uses, must have work strokes that are substantially uniform thus requiring a predetermined temperature cycle. Where such a cycle is predicated on weather averages, for example, variations in excess of the range may occur, a further objective of the invention is to enable such variations to be accommodated where any overdrive could not be tolerated.

In accordance with the invention, this objective is attained by providing resilient couplings between each tubular member and the mechanisms driven thereby which couplings yield when predetermined work strokes are exceeded in either direction thus to accommodate the lengthened strokes.

Other objectives of the invention and other of its novel features and advantages will be apparent from the accompanying specification and the appended claims.

BRIEF DESCRIPTION OF THE DRAWINGS

The accompanying drawings illustrate preferred embodiments of the invention of which.

THE PREFERRED EMBODIMENTS OF THE INVENTION

Figure 1:
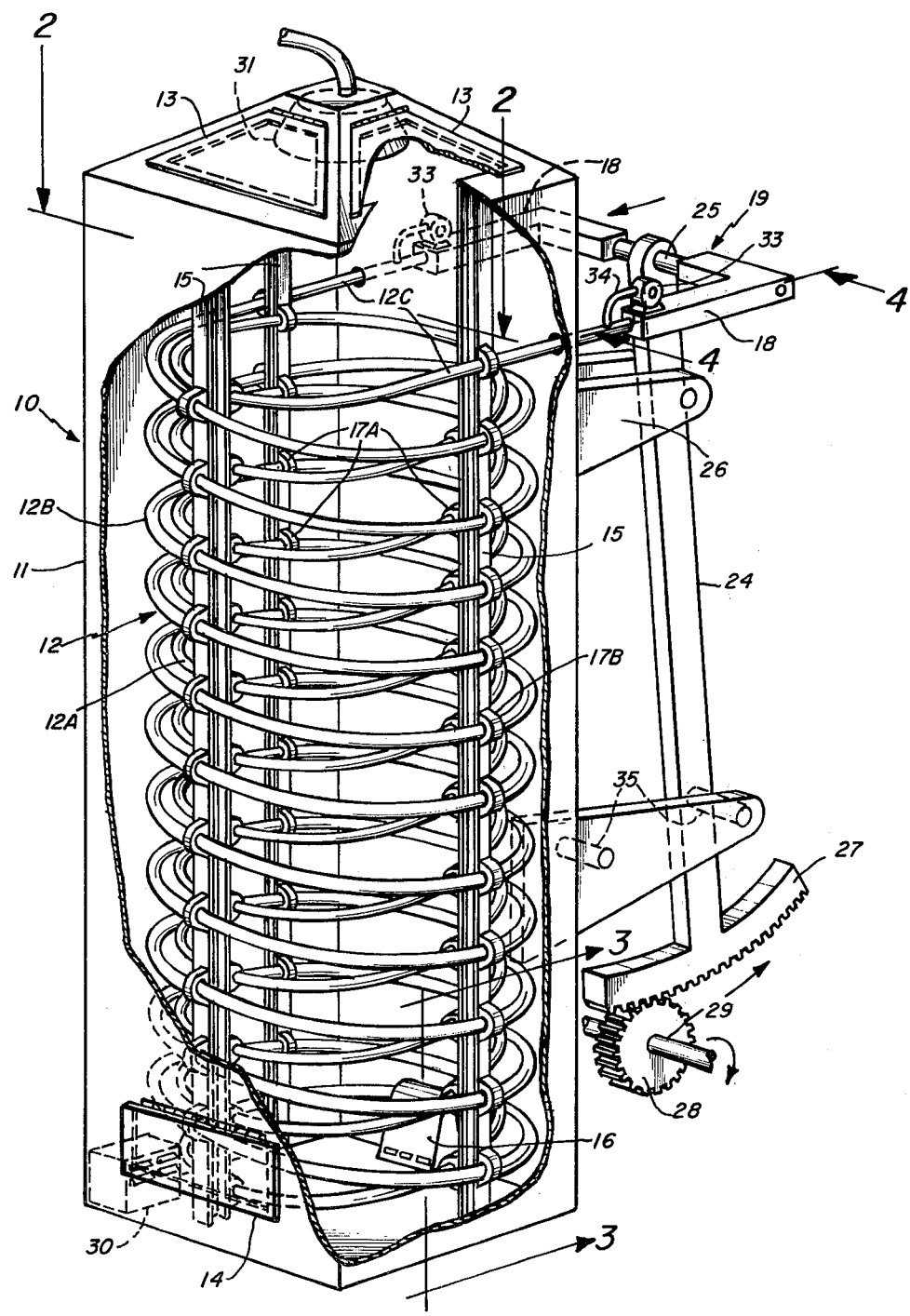
FIG. 1 is a somewhat schematic view of a prime mover in accordance with one embodiment of the invention.
Figure 2:
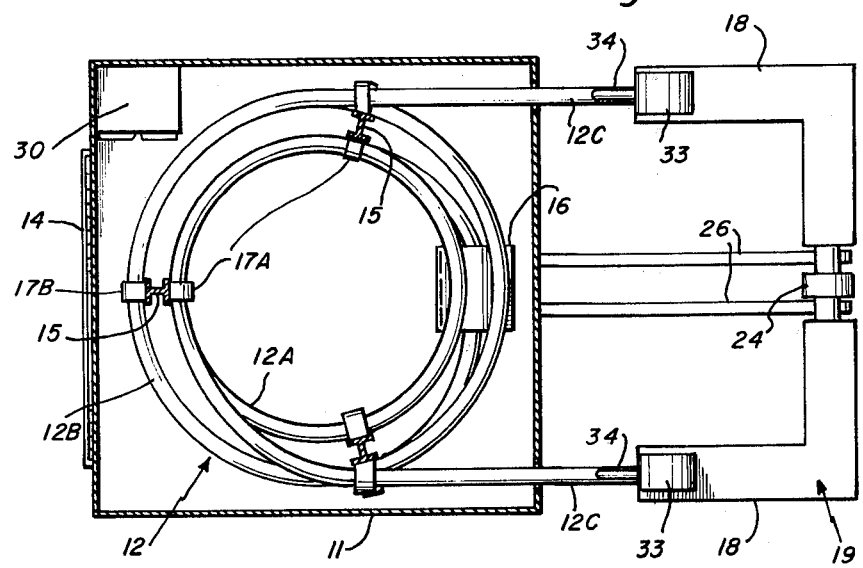
FIG. 2 is a section taken approximately along the indicated line 2—2 of FIG. 1.

The prime mover, generally indicated at 10 in FIG. 1, is to be operated primarily by ambient atmospheric temperatures on a day and night cycle and is shown as including a tower 11 of substantial height housing a coiled tubular metal member 12 subject to expansion and contraction during each cycle. The tubular stock from which the member 12 is formed is preferably an aluminum alloy. The tower 11 is of a construction maximizing the solar heating of its interior during the day and has exhaust ports 13 in its roof and louvers 14 in its sides to be opened at night of which only one is shown.

Within the tower 11, there are vertical and appropriately reinforced columns 15 spaced and arranged to support the coils of the member 12 and permit sliding movement thereof as the member expands and contracts. While the member 12 may be a single, vertical coil or concentric separate vertical coils, it is shown as having an intermediate portion secured to an anchor 16 on the floor of the tower with one end portion 12A in the form of a vertical coil with its turn slidably held by holders 17A on the inside surfaces of the columns 15 and the other end portion 12A in the form of a vertical coil outside the columns 15 and slidably connected thereto to holders 17B. The turns of the end portions 12A and 12B are arranged so that their straight ends 12C are parallel and of the same length. The member 12 is desirably made from separate sections which may be preformed or shaped and interconnected at the erection site.

Figure 4:
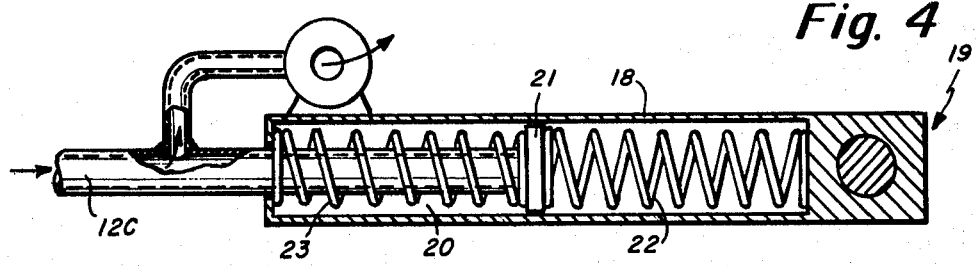
FIG. 4 is a section taken approximately along the indicated line 4—4 of FIG. 1.

The end portions 12C extend outwardly through ports adjacent the roof of the tower 11 and are connected to the side arms 18 of a U-shaped holder 19. In FIG. 4, the connection of the ends 12C to the side arms 18 is shown as effected by having such side arms have open-ended chambers 20 and the ends 12C provided with heads 21 entrant thereof and yieldably held against movement relative thereto in either direction by springs 22 and 23 selected to yield under conditions presently to be discussed.

A lever 24, the length of which is shown as nearly equal to the height of the tower 11, is pivotally supported at its upper end by the central pivot 25 of the holder 19. The lever 24 is pivotally held by a fulcrum mount 26 located relatively close to the holder 19 so that the arcuate rack 27 fixed on the lower end of the lever 24 will swing through an arc of substantial length relative to the short distance the upper lever end moves as the member 12 expands and contracts to provide work strokes.

The arcuate rack 27 is shown as meshing with a pinion 28 on a shaft 29 by which a mechanism or mechanisms are driven and which are operable to convert the energy derived from the member 12 into a form that may be stored and released at a controlled rate. Examples of such mechanisms are shown in my above referred-to copending application.

The tower 11 is also provided with heating means 30 adjacent its base and a cooling water spray head 31 adjacent the exhaust ports 13 to enable the interior of the tower 11 to be heated and then cooled if day and night temperature changes are inadequate to provide a predetermined work stroke.

Figure 8:
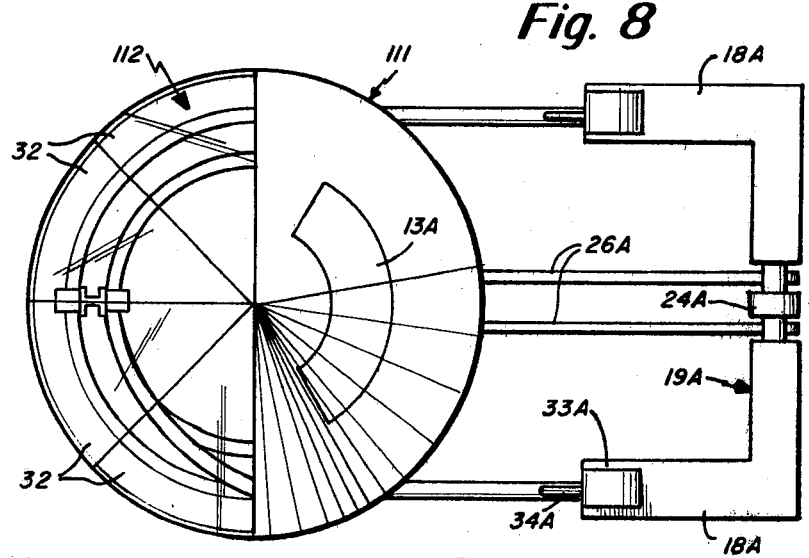
FIG. 8 is a somewhat schematic top plan view of another prime mover of the type illustrated by FIG. 1.

In FIG. 8, a tower 111 is shown as including a roof, the east, south and west portions of which are in the form of a sectioned frensel lens 32 shaped and dimensioned to concentrate the sun's rays on upper turns of the member 112. The prime mover of which the tower 111 is a part is or may be otherwise identical to that illustrated by FIGS. 1-4 and corresponding parts are indicated by the same reference numerals distinguished by the suffix addition A.

Figure 3:
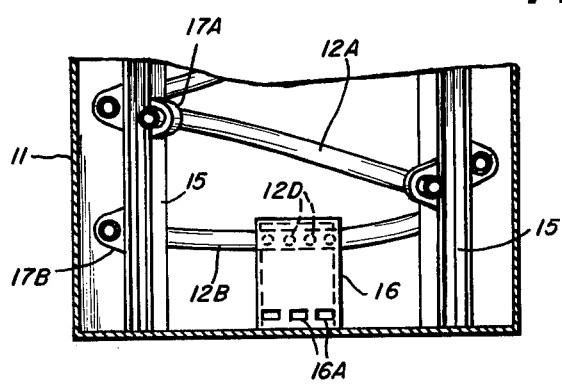
FIG. 3 is a section taken approximately along the indicated line 3—13 of FIG. 1.

It will be noted that in FIG. 3, the anchor 16 has ports 16A and that the portion of the tubular member 12 within it has ports 12D. Rather than to place reliance on natural drafts to effect the circulation of air through both ends of the member 12, each side arm 18 supports a pump 33 in the intake of which is placed in communication with the interior of the appropriate one of the ends of the member 12 by a conduit 34.

For optimum results in the case of many mechanisms, substantially uniform work strokes are required. When heating and cooling intervals can be controlled to establish a predetermined range of operating conditions, a problem is overcome that exists when reliance is placed on ambient atmospheric temperatures in a range based on weather averages. In that case, maximum or minimum temperatures or both may be exceeded. To enable excess travel in either direction to be accommodated without corresponding overtravel of a mechanism, a pair of stops 35, shown as mounted on the tower 11, are spaced apart to limit the extent to which the lever 24 may swing. When either stop 35 is engaged, any further movement of the member 12 results in the compression of the appropriate one of the springs 22, 23 to an extent permiting further short expansion or contraction.

It has been postulated that a member 12 formed from an aluminum alloy rod, one square inch in cross section and seven hundred feet in length will produce at least 60,000 PSI pressure in any 20° F. ambient temperature change and one inch of travel. It will be appreciated that heat transfer rates depend on the thickness of the metal, other considerations being equal, so that if the yield stress requires an increase in the thickness of the metal, heat transfer rates would be affected, but minimized by the use of tubular stock which may be several inches in diameter with a wall thickness such that heat transfer rates are favorable.

Mention has been made of the use of auxiliary heating and cooling means and economic considerations determine the nature of such means and when a driven mechanism generates electricity, how much energy may be diverted for cooling and heating purposes. Where ambient atmospheric temperatures are not relied on or must be supplemented, the heating means may be hot waste exhaust gases or waste heat and the water used as a cooling spray may be waste water from another system or diverted river water by way of examples.

While members 12 in the form of vertical coils offer space requirement advantages over horizontal members, the use of horizontal members often is advantageous.

Figure 5:
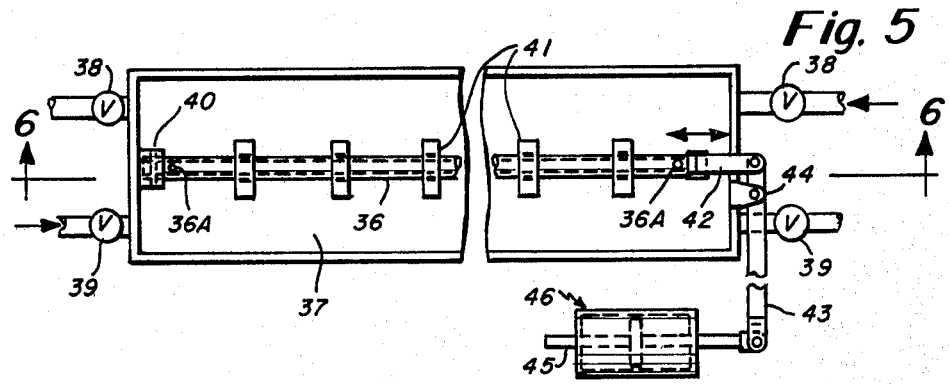
FIG. 5 is a schematic view of another embodiment of the invention.
Figure 6:
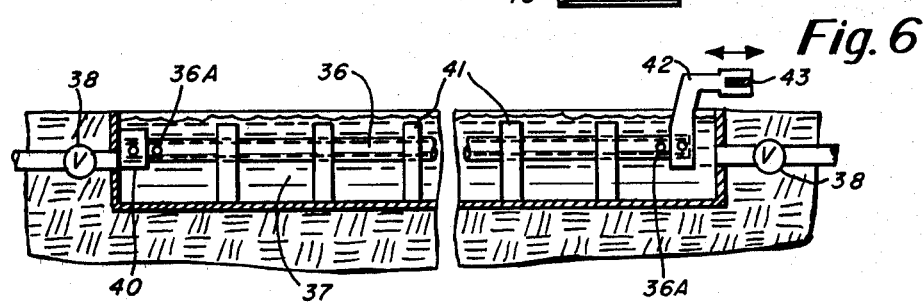
FIG. 6 is a section taken along the indicated line 6—6 of FIG. 5.

Reference is now made to FIGS. 5 and 6 wherein a straight tubular, open-ended, metal member 36 having end ports 36A is shown as extending lengthwise of an area 37 which is subject to being so heated and cooled as to provide a temperature spread of, say, 30° F. The area 37 may be a long narrow pond having gates 38 at its ends enabling heated waste water of a nuclear operated power plant, for example, to be diverted therethrough and gates 39 at its ends which enable cooling water to flow therethrough. The cooling water may be that required for the plant's cooling system, ocean water, or diverted river water.

While both ends of the member 36 could be used to produce a work stroke, the member 36 is shown as having one end anchored as at 40 and as being slidably held by spaced supports 41. Because the member 36 is submerged in the heating and cooling waters, it is shown as having at its free end, a vertically spaced and braced head 42. A long lever 43 is pivotally connected to the head 42 with its fulcrum 44 located relatively close thereto. The other end of the lever 43 is shown as being pivotally connected to a piston rod 45 operating a double acting air compressor generally indicated at 46, for one example.

Figure 7:
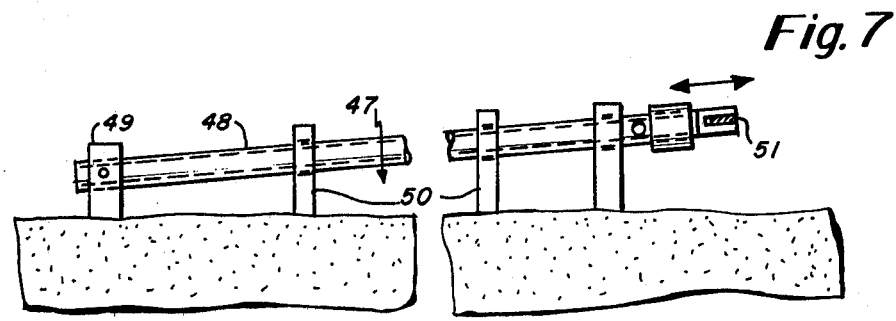
FIG. 7 is a schematic view of another embodiment of the invention.

Another embodiment of the invention is illustrated by FIG. 7 where the area 47 could be a desert where sand is heated during the day and cooled at night to provide a useful temperature range or a coastal area where sand or mud flats are suitable heated at low tide and cooled at high tide.

In this embodiment of the invention, the long, straight tubular metal member 48 is shown as having one end fixed as at 49 and as being slidably held by supports 50. The free end of the member 48 has a long horizontal lever 51 connected thereto which is or may be similar to the lever 43 of FIGS. 5 and 6 and used in the same member to operate a mechanism capable of storing energy to be used at a controlled rate. Where the area 47 is a desert, it is preferred that the member 48 be inclined to ensure the flow of heating and cooling air through it.

It appears to be well established that it is economically feasible in certain locations to utilize the temperature differential between warm ocean surface water and cold deep sea water to provide useful, low-pressure steam. See, for example, "Power, Fresh Water and Food From the Sea", *Mechanical Engineering*, September 1976. In this article, it is stated that temperature spreads of such waters may be as much as 25° F. to 45° F.

Figure 9:
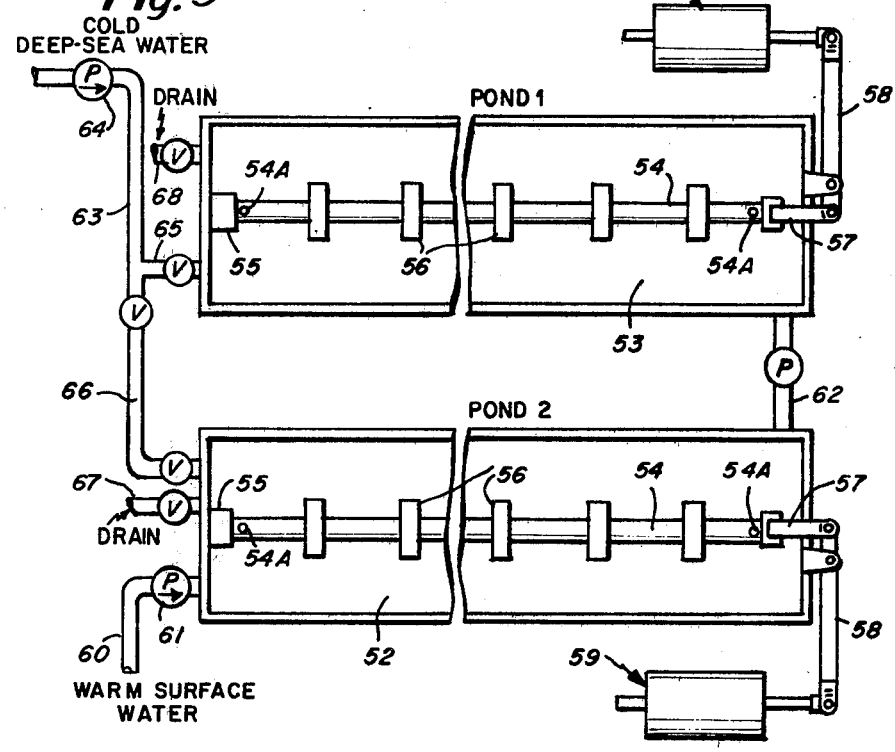
FIG. 9 is a schematic view of a power plant operated by warm surface sea water and cold deep sea water.

In FIG. 9, there are shown long narrow ponds 52, 53 in a location where surface ocean water and deep sea water have a sufficient temperature spread. In each pond, there is a long, straight, open-ended, tubular metal member 54 with one end fixed as at 55 and slidably held by supports 56. Each member 54 has end ports 54A and a braced, vertically spaced head 57 pivotally connected to a long lever 58 shown for convenience as similar to the levers 43 and 51 and employed to operate devices capable of storing and releasing energy at a controlled rate.

A surface water conduit 60 is provided with a pump 61, enabling surface water to be introduced into the pond 52 to inundate the member 54 therein. At the end of the expansion stroke of that member 54, the pond water is drained or pumped via a conduit 62 into the pond 53 to heat the member 54 therein. A cold deep sea water conduit 63 has a pump 64 and valve controlled conduits 65 and 66 enabling cooling water to be delivered to either pond. The pond 52 has a valve controlled drain 67. When the cooling water in the pond 53 is so warmed that it cannot be used to advantage it may be drained via a valve controlled drain 68.

In all embodiments of the invention, either or both ends of the tubular members may be employed to effect the operation of one or more mechanisms.

I claim:

1. A prime mover for operating a mechanism capable of producing energy that may be stored and released at a controlled rate, said prime mover including a tower constructed to be solar heated and cooled at night, a tubular metal member of substantial length and in the form of a vertical coil within the tower, means operable to subject the exterior surfaces of said member to heating and cooling intervals, means to effect the flow of ambient atmosphere through said coil during both intervals, said heating and cooling intervals and the length and wall thickness of said member such that the expansion and contraction of said member produces work strokes having a substantial force but too short for use in operating said mechanism directly, and means connected to at least one end of said member and operable to convert the work strokes into second work strokes of increased length but having a decreased force, the length and force of the second work strokes adequate to operate said mechanism.

2. The prime mover of claim 1 in which the heating and cooling intervals are predicted on a predetermined temperature spread thereby to produce second work strokes that are substantially uniform in length and means operable to prevent overtravel of said converting means while permitting an increase in length of the work stroke in either direction of the member in the event the predetermined temperature spread is exceeded, said means including stops limiting the second work stroke to a predetermined maximum in either direction if said temperature spread is exceeded and resilient means incorporated in said member and operable in either direction of the work strokes thereof to absorb the resulting overtravel of the member.

3. The prime mover of claim 1 in which the upper portion of the tower includes a frensel lens arrangement, dimensioned and disposed to concentrate the sun's rays on upper turns of the member.

4. The prime mover of claim 1 in which there are two vertical coils, one an inner coil and an outer coil.

5. The prime mover of claim 1 in which there is an anchor at the bottom of the tower to which the member is secured and the means to effect the flow of ambient atmosphere through the member is a pump the intake of which is in communication with the interior of the member adjacent said one end.

6. The prime mover of claim 4 in which there is an anchor at the bottom of the tower, the two coils are interconnected within the anchor and have air inlets, the means to effect the flow of ambient atmosphere through the member are pumping means in communication with the interior of the coils adjacent their upper ends and operable to draw air upwardly therethrough.

7. The prime mover of claim 6 in which the two coils are of the same length.

* * * * *